United States Patent
Kigoshi (10) Patent No.: US 6,616,571 B2
(45) Date of Patent: Sep. 9, 2003

(54) DEVICE AND METHOD FOR CONTROLLING GEAR SHIFTING OF SUBTRANSMISSION

(75) Inventor: Kaoru Kigoshi, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/076,969

(22) Filed: Feb. 15, 2002

(65) Prior Publication Data

US 2002/0115528 A1 Aug. 22, 2002

(30) Foreign Application Priority Data

Feb. 22, 2001 (JP) ...................................... 2001-047077

(51) Int. Cl.[7] .............................................. F16H 61/16
(52) U.S. Cl. ......................................... 477/36; 477/125
(58) Field of Search ............................ 477/36, 97, 125, 477/902, 908; 74/336 R; 701/62, 66

(56) References Cited

U.S. PATENT DOCUMENTS 5,754,970 A * 5/1998 Takasaki et al. ............... 701/87
6,067,878 A * 5/2000 Jorgensen .................... 477/125
6,125,317 A * 9/2000 Prakash et al. ............... 701/69
6,480,771 B2 * 11/2002 Nishida et al. ........... 74/336 R

* cited by examiner

Primary Examiner—Sherry Estremsky
(74) Attorney, Agent, or Firm—McCormick, Paulding & Huber LLP (57) ABSTRACT

In a procedure for controlling gear shifting of a subtransmission which can be carried out only when a vehicle is substantially standing, a vehicle speed pulse is generated, a time is counted from the time each vehicle speed pulse is generated (steps 101, 102). This time is a period for which a first condition by which the vehicle can be considered, regardless of the pulse, to be running is satisfied. At the same time the first condition becomes unsatisfied from a satisfied state, the counted time is determined to be a first condition satisfied period T1, and a waiting period Tw is determined in a predetermined manner by using the first condition satisfied period (step 103). A time T2 is counted from the time the first condition becomes unsatisfied, and when the counted time T2 reaches the determined waiting period, the gear shifting of the subtransmission becomes possible (step 105).

13 Claims, 5 Drawing Sheets

DEVICE AND METHOD FOR CONTROLLING GEAR SHIFTING OF SUBTRANSMISSION

CROSS REFERENCES TO RELATED APPLICATIONS

This application claims priority of Japanese Patent Application No. 2001-047077 filed in JPO on Feb. 22, 2001, the entire disclosure of which is incorporated herein by reference.

BACKGROUND OF THE INVENTION

1. Field of the Invention

The present invention relates to a device and a method to control gear shifting of a subtransmission. More particularly, the present invention relates to a device and a method suitable to control gear shifting of the subtransmission whose gear can be shifted to a high speed gear and a low speed gear. The subtransmission can be provided on a transfer of a four-wheel-drive vehicle.

2. Description of the Related Art

A transfer (a device for distributing drive force) of a four-wheel-drive vehicle is often provided with a subtransmission so as to enable gear shifting of the subtransmission between a high speed gear and a low speed gear. This gear shifting is carried out automatically by an actuator and a control unit. In this case, a switch is provided in a room of the vehicle, a driver can operate the switch in the room, and thereby the gear shifting of the subtransmission is automatically carried out.

In the meantime, this type of subtransmission generally does not include a synchronization mechanism. Furthermore, in the subtransmission, the gear rate of the low speed gear to the high speed gear is large, so that when the gear is changed from the high speed gear to the low speed gear, or from the low speed gear to the high speed gear in a state where the vehicle is running, mechanical damage can be caused. For these structural reasons, there are many cases in which the gear is prohibited from being shifted from the high speed gear to the low speed gear, or from the low speed gear to the high speed gear in the state where the vehicle is running, and only when the vehicle is standing, the gear shifting of the subtransmission can be carried out.

Conventionally, a speed of the vehicle is obtained from a pulse generated by a vehicle speed sensor, and the vehicle is assembled such that when the speed of the vehicle becomes zero or close to zero (this is called a substantially standing state), the gear shifting of the subtransmission becomes possible.

However, the vehicle speed sensor used for a speed indicator of a speedometer generates a pulse at intervals in accordance with the vehicle speed. When the vehicle speed becomes zero, the pulse is not generated, and when the vehicle is running at a considerable low speed close to zero, an interval between pulses is a greatly increased value. Therefore, accuracy in a vehicle speed detected by the vehicle speed sensor is considerably deteriorated. Although this deteriorated accuracy satisfies the speed indicator of the speedometer, the following problem occurs in a case where pulse data is used for judging whether or not the gear shifting of the subtransmission can be carried out.

In other words, an interval between pulses are detected, and this detected interval is converted into the vehicle speed. Accordingly, if after a certain pulse is generated, the next pulse is not generated, the vehicle speed cannot be calculated. However, when the vehicle is running at a very low speed (for example, 3 kilometers per hour), the interval between generation of a certain pulse and generation of the next pulse can be several seconds (for example, 3 seconds). Even if the driver operates the switch in order to carry out the gear shifting of the subtransmission during this interval, the gear shifting cannot be carried out unless the control unit waits for several seconds and recognizes that the vehicle speed is zero or near zero. As a result, the driver who operated the switch feels that something is wrong with this switching operation.

Furthermore, if the driver stops the vehicle by abruptly depressing a brake pedal during the interval between generation of a certain pulse and generation of the next pulse, the next pulse cannot be generated until the vehicle runs again. Therefore, a vehicle speed cannot be detected until the next pulse is generated. As a result, even if the driver operates the switch in order to carry out the gear shifting of the subtransmission during this period, the gear shifting cannot be carried out, so that a problem occurs.

In the meantime, there is one possible method for preventing this problem. In this method, the control unit judges that the vehicle speed is zero if a pulse is not detected within a predetermined period, and the gear shifting of the subtransmission can be carried out. However, in this method, also when a failure such as breaking of an electric line occurs and for this reason a pulse cannot be sent, the control unit judges that the vehicle speed is zero, so that there is a problem that the gear shifting can be carried out while the vehicle is running.

SUMMARY OF THE INVENTION

With the view of the above-mentioned problems, the present invention was made, and it is an object of the present invention to provide a device and a method for controlling gear shifting of a subtransmission. In this device and this method, a state where the vehicle is substantially standing is accurately recognized, the gear shifting of the subtransmission can be immediately carried out in a case where the vehicle is substantially standing, and it is possible to securely prevent the gear shifting during a state where the vehicle is running and there is a failure.

According to one aspect of the present invention, there is provided a device for, by using an actuator or a control unit, controlling gear shifting of a subtransmission which is installed on a vehicle and whose gear can be shifted only when the vehicle is substantially standing. This device includes vehicle speed pulse generating means for generating a vehicle speed pulse in accordance with a vehicle speed, first judging means for, without depending on the vehicle speed pulse, judging whether or not a first condition by which the vehicle can be considered to be running is satisfied, first timer means for counting a period of time for which the first condition is satisfied from the time each vehicle speed pulse is generated, first condition satisfied period determining means for determining a value of the period counted by the first timer mean to be a first condition satisfied period at the moment the satisfied first condition becomes unsatisfied, waiting period determining means for determining a waiting period in a predetermined manner by using the first condition satisfied period, second timer means for counting a period of time from the time the satisfied first condition becomes unsatisfied, and vehicle speed requirement accepting means for accepting the vehicle is standing or running at a very low speed or less when the period of time counted by the second timer means reaches the waiting period.

Preferably, the device further includes a switch which is manually operated so as to make a command to the effect that the gear shifting of the subtransmission should be carried out, and second judging means for judging whether or not a second condition by which the gear shifting of the subtransmission becomes possible is satisfied. This second condition includes a requirement that the vehicle should be standing or running at a very low speed or less. Preferably, when the switch is operated and switched, if the second condition is satisfied, the gear shifting of the subtransmission is carried out, and if the second condition is not satisfied, the gear shifting of the subtransmission is not carried out. Furthermore, when the switch is operated and switched, if the second condition is not satisfied, the gear shifting of the subtransmission is preferably not carried out even if the second condition becomes satisfied after the switch is operated and switched.

The first condition preferably includes a requirement that the vehicle should be running, and a requirement that a shift position of a main transmission is a position other than a neutral position and a parking position.

The second condition preferably further includes a requirement that an engine revolution speed should be equal to or less than a predetermined value, and a requirement that the shift position of the main transmission should be the neutral position or the parking position as well as the requirement that the vehicle should be standing or running at a very low speed or less.

Preferably, the waiting period is increased as the first condition satisfied period is increased, and an increase rate of the waiting period to the first condition satisfied period is changed to a larger value from a smaller value when the first condition satisfied period exceeds a predetermined threshold value. Further, the threshold value of the first condition satisfied period is preferably approximately a maximum period for which a signal (vehicle speed pulse) is awaited.

Preferably, at the moment the satisfied first condition becomes unsatisfied, the period counted by the first timer means is retained, and then if the unsatisfied first condition becomes satisfied, an additional count of the retained value is started.

The count of the first timer means is preferably cleared each time a vehicle speed pulse is generated.

The count of the first timer means is preferably cleared when an ignition switch is turned off.

The count of the first timer means is preferably cleared at the moment the gear shifting of the subtransmission is started or completed.

The subtransmission may be installed on a transfer of a four-wheel-drive vehicle.

According to another aspect of the present invention, there is provided a method of, by using an actuator and a control unit, controlling the gear shifting of the subtransmission which is installed on a vehicle and whose gear can be shifted only when the vehicle is substantially standing. In this method, a vehicle speed pulse is generated in accordance with a vehicle speed, and a first period of time for which a first condition, by which the vehicle can be considered to be running regardless of the vehicle speed pulse, is satisfied is counted from the time each vehicle speed pulse is generated. Moreover, in this method, when the satisfied first condition becomes unsatisfied, the first counted period of time is simultaneously determined to be a first condition satisfied period, a waiting period is determined in a predetermined manner by using the first condition satisfied period, a second period of time is counted from the time the satisfied first condition becomes unsatisfied, and it becomes possible to accept the vehicle is standing or running at a very low speed or less when the second counted period of time reaches the waiting period.

Additional objects, aspects, benefits and advantages of the present invention will become apparent to those skilled in the art to which the present invention pertains from the subsequent detailed description and the appended claims, taken in conjunction with the accompanying drawings.

DETAILED DESCRIPTION OF THE INVENTION

Embodiments of the present invention will now be described in reference to the accompanying drawings.

Figure 7:
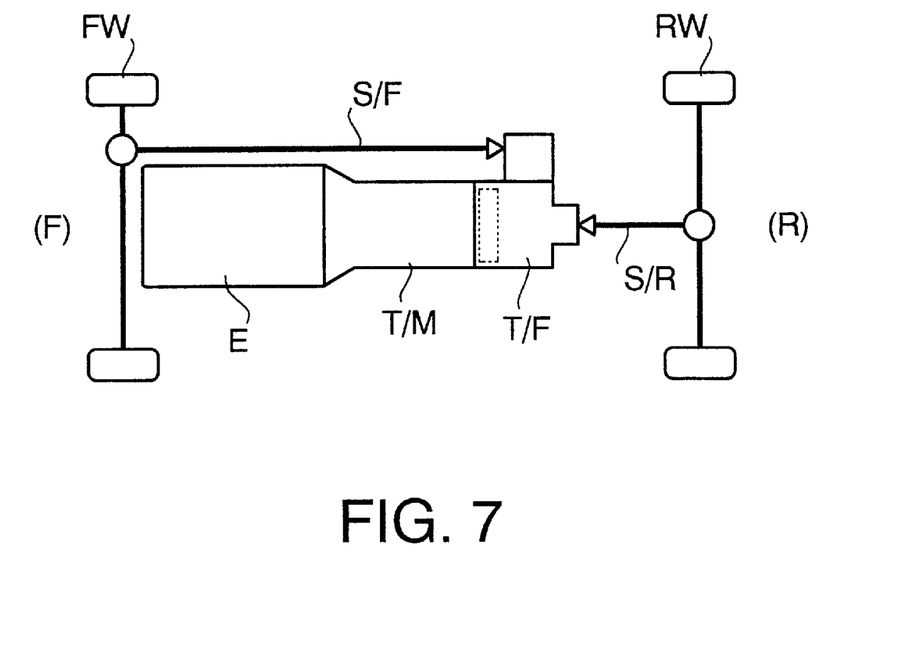
FIG. 7 is a plan view of a four-wheel-drive vehicle according to the embodiment of FIG. 1, the left side of the view is a front side of the vehicle, and the right side is a rear side.

First, a four-wheel-drive vehicle will be described as well as a transfer. As shown in FIG. 7, the four-wheel-drive vehicle is assembled such that drive force of an engine E is transmitted backwards to a transmission (main transmission) TIM and a transfer T/F at which the drive force is divided into a front side and a rear side, and then front wheels FW and rear wheels RW are driven by transmitting the divided drive force to these wheels. The front wheels FW may be selectively driven, and structure of the so-called Front-engine Rear-based part-time four-wheel drive (4WD) may be adopted. The main transmission T/M may be assembled as a manual type of transmission including a friction clutch or may be assembled as an automatic type of transmission including a fluid converter.

Figure 5:
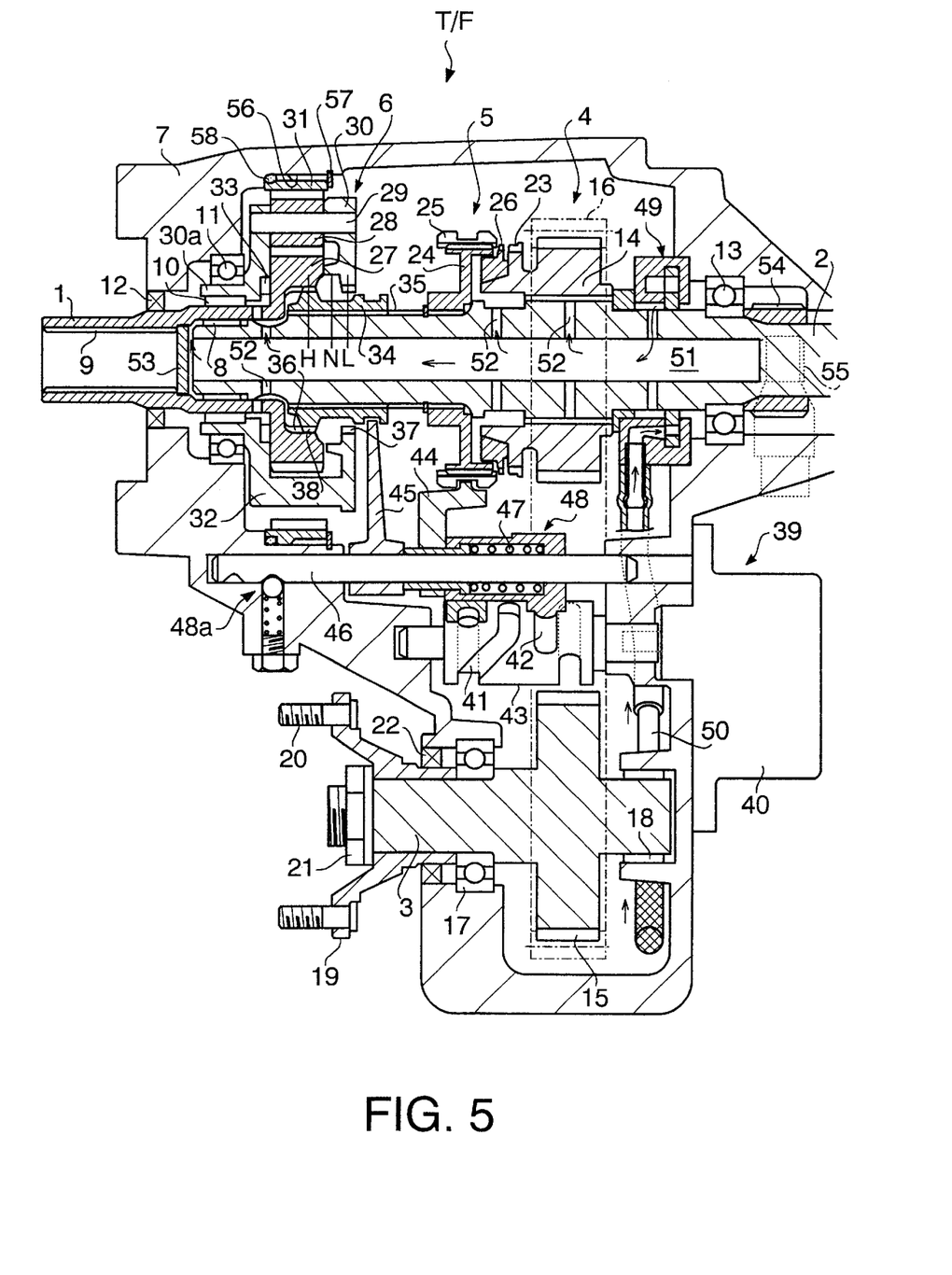
FIG. 5 is a longitudinal sectional view showing a transfer according to the embodiment of FIG. 1, the left side of the view is a front side, and the right side is a rear side.

The transfer T/F shown in FIG. 5 receives drive force from the main transmission TIM, and not only outputs the drive force to the rear-wheel side from a rear-side output shaft 2 but also selectively outputs the drive force to the front-wheel side from a front-side output shaft 3. A rear-side output shaft 2 and a front-side output shaft 3 can be connected to each other via a distributing device 4 including a chain and sprocket mechanism. The distributing device 4 divides the drive force to distribute the divided drive force to the rear-side output shaft 2 and the front-side output shaft 3. The distribution of the drive force to the front side is selectively carried out by a selecting device 5. This mechanism may be the same as a transmission mechanism of a normal manual transmission.

The transfer T/F is provided with a subtransmission 6 having a planetary mechanism so as to shift the entire gear of the transfer to a high speed gear stage or a low speed gear stage. When the subtransmission is in a high speed gear, a deceleration rate is "1", that is, a state is in direct connection. On the other hand, when the subtransmission is in a low speed gear, the deceleration rate is a value larger than "1" (in this embodiment, this value is "2.5"), and the rotation of an input shaft 1 is transmitted to the output side by decelerating the rotation of the input shaft 1. The positions of the subtransmission 6 also include a neutral position (N position). A common transfer casing 7 accommodates an entire mechanism including the input shaft 1, the rear-side and front-side output shafts 2 and 3, the distributing device 4, the selecting device 5, and the subtransmission 6.

At or near a front end of the transfer T/F, the input shaft 1 is aligned to and connected to the rear-side output shaft 2 by inserting one of them into the other or another way. These two shafts 1 and 2 can rotate relative to each other. A needle bearing 8 is installed at the connecting part. The input shaft 1 has a cavity inside itself, and a front part of the input shaft 1 protrudes from the casing 7. Moreover, a spline 9 is formed inside the input shaft 1, and an output shaft of the main transmission (not shown) can engage with the spline 9, and thereby be connected to the spline 9. The input shaft 1 is rotatably supported by a needle bearing 10 and by a front bearing 11 including a ball bearing via a carrier bearing 30a, thereby supporting the input shaft 1 from an outer side. In this manner, the input shaft 1 is supported by the needle bearing 8 and the front bearing 11 from both of the inner side and the outer side. A space between the input shaft 1 and the casing 7 is sealed by an oil seal 12.

The rear-side output shaft 2 extends over approximately an entire length of the transfer. The rear end of the rear-side output shaft 2 is rotatably supported by a rear bearing 13 including a ball bearing. The rear end part (not shown) of the rear-side output shaft 2 protrudes from the casing 7. As shown in FIG. 7, a rear-wheel-drive shaft S/R (propeller shaft) can be connected to the rear end part of the rear-side output shaft 2.

The distributing device 4 is provided at approximately a middle location of the rear-side output shaft 2. The distributing device 4 includes a driving sprocket (driving member) 14 installed on the outer circumferential side of the rear-side output shaft 2 such that the driving sprocket can rotate relative to the rear-side output shaft 2. The distributing device 4 further includes a driven sprocket (driven member) 15 fixed on the front-side output shaft 3, and a chain 16 for linking the sprocket 14 to the sprocket 15. The front end part of the front-side output shaft 3 is supported by a ball bearing 17, and the rear end part of the front-side output shaft 3 is supported by a needle bearing 18. The front end part of the front-side output shaft 3 protrudes from the casing 7. A flange 19 is fasten by a nut 21 at the protruding part of the front-side output shaft 3. As shown in FIG. 7, a front-wheel-drive shaft S/F can be connected to the transfer T/F via a bolt 20. A space between the protruding part of the front-side output shaft 3 and the casing 7 is sealed by an oil seal 22.

Figure 6:
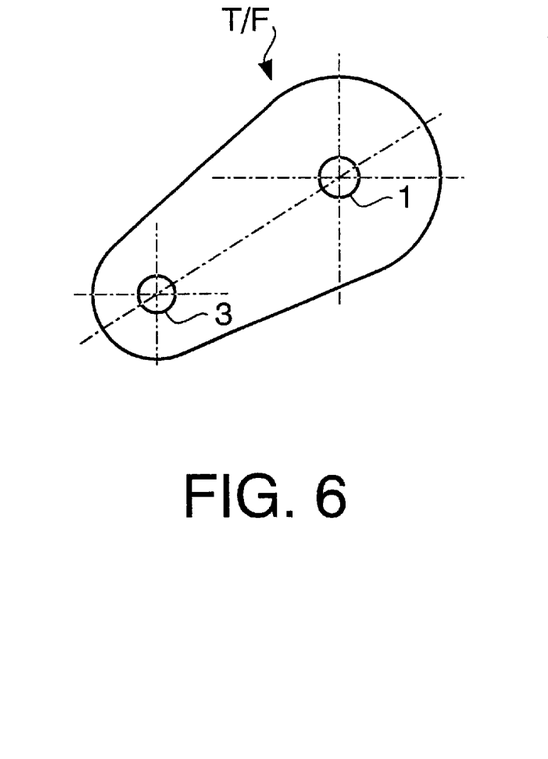
FIG. 6 is a schematic front view of the transfer of FIG. 5.

Referring to a front view of FIG. 6, the transfer T/F is not perpendicular to the ground, but inclined to the ground. The front-side output shaft 3 is located below the input shaft 1 off to the left (or off to the right). The positions of these shafts are offset in the right and left directions. In this manner, the transfer T/F can be prevented from interfering with the engine E, the main transmission T/M, and/or the front-wheel-drive shaft S/F.

The selecting device 5 is installed in the front of the sprocket 14 so as to be adjacent to the sprocket 14. The selecting device 5 includes a dog gear 23 installed on the driving sprocket 14, a clutch hub 24 fixed to the rear-side output shaft 2, a selecting sleeve 25 connected to an outer circumference of the clutch hub 24 by splining so as to slide in an axial direction, and a synchronizer ring 26 installed between the dog gear 23 and the clutch hub 24. A two-wheel-drive (neutral) state is shown in FIG. 5. If the selecting sleeve 25 is moved to a rear side from this state, synchronization is achieved by the synchronizer ring 26, and the selecting sleeve 25 is made to engage the dog gear 23. In this manner, the clutch hub 24 and the dog gear 23 are connected to each other, and the rear-side output shaft 2 and the sprocket 14 are connected to each other. As a result, torque force of the raer-side output shaft 2 is distributed to and transmitted to the front-side output shaft 3, leading to a four-wheel-drive state.

The subtransmission 6 is installed in the front of the selecting device 5 and at or near the connecting part of the input shaft 1 and the rear-side output shaft 2. The subtransmission 6 is a planetary type of transmission, and includes a sun gear 27, a plurality of planetary gears 28 for engaging the outer circumferential part of the sun gear 27, a carrier 30 for supporting each of the planetary gears 28 via a shaft 29, and a ring gear 31 having an inner circumferential gear for engaging each of the planetary gears 28.

The carrier 30 includes a bridge 32 in a circumferential position where there is not the planetary gear 28. The bridge 32 also extends to the back side of the sun gear 27 and the planetary gears 28 to support both ends of the shaft 29. The carrier bearing part 30a, which is a part of the carrier 30, protrudes frontwards from the carrier 30, and is supported between the needle bearing 10 and the front bearing 11. A thrust needle bearing 33 for reducing a thrust load or impact between the sun gear 27 and the carrier 30. The ring gear 31 is connected to the casing 7 by splining or insertion, but there is a space in a radial direction between the ring gear 31 and the casing 7. Therefore, the ring gear 31 can slightly and eccentrically move due to the space (so-called floating support mechanism). A absorber ring 58 having a rubber material is provided for buffering impact by collision of the ring gear 31 and the casing 7.

The ring gear 31 is inserted from backwards to a ring gear connecting hole 56, and a snap ring 57 prevents the ring gear 31 from slipping from the hole 56. The absorber ring 58 is inserted and attached at the end part of the ring connecting hole 56 before the ring gear 31 is inserted. After insertion of the absorber ring 58, the ring gear 31 is inserted into the hole, and the front end part of the ring gear 31 is pressed against the absorber ring 58.

A cavity is provided at an inner side in terms of a radial direction between the sun gear 27 and the carrier 30, and a switching sleeve 34 is mounted at a position where there is the cavity such that the switching sleeve 34 can slide along the rear-side output shaft 2. The spline 35 is provided on the rear-side output shaft 2, and the sleeve 34 is connected to this spline 35 by splining. This manner allows the sleeve 34 to slide in an axial direction, and prevents the sleeve 34 from turning around the rear-side output shaft 2.

The splines 36, 37 and 38 are provided on the inner circumferential parts of the sun gear 27 and carrier 30 and on the outer circumferential part of the switching sleeve 34, respectively. The gear shifting of the subtransmission between the high speed gear state and the low speed gear state is performed by sliding the switching sleeve 34 and selectively engaging the spline 38 of the switching sleeve 34 with either of the sun gear spline 36 and the carrier spline 37.

A neutral (N) position for putting the spline 38 of the switching sleeve 34 in a stage in which the spline 38 does not engage the splines 36 and 37 is provided between the sun gear spline 36 and the carrier spline 37. This subtransmission or this gear shifting mechanism is not provided with synchronization mechanism, and the gear rate of a low speed gear to high speed gear is large ("1" or "1.5"). Accordingly, from the standpoint of the mechanical structure, the gear shifting of the subtransmission must be carried out at a very low speed close to zero or at a zero speed (in a state where the vehicle is substantially standing).

As shown in FIG. 5, in a state where the switching sleeve 34 engages with the sun gear 27, the input shaft 1 is substantially directly connected to the rear-side output shaft 2, and the torque of the input shaft 1 is transmitted to the rear-side output shaft 2 without dividing the torque. This state corresponds to the high speed gear position. At this time, the planetary gears 27 are rotated by following the sun gear 27.

On the other hand, when the switching sleeve 34 is slid backwards from the state of FIG. 5, the switching sleeve 34 can pass through the N position, and engages with the carrier 30. At this time, the torque of the input shaft 1 is transmitted to the rear-side output shaft 2 via a plurality of members, i.e., the sun gear 27, the planetary gears 28, the carrier 30, and the switching sleeve 34 in this order. The torque of the rear-side output shaft 2 becomes smaller than that of the input shaft 1. This state corresponds to a low speed gear position.

In this transfer, by a common actuator 39, it is possible to automatically carry out the switching of the selecting device 5 between the two-wheel drive and the four wheel drive, and the gear shifting of the subtransmission 6 between the high gear position and the low gear position. The actuator 39 includes a motor 40 whose phase is controlled by the control unit, a cylindrical cam 43 having two cam grooves 41 and 42 which are provided for switching of the selecting device 5 and the subtransmission 6. The cylindrical cam 43 is rotated to a plurality of phase positions in a stepping manner by the motor 40. The actuator 39 further includes a selecting arm 44 for engaging with the cam groove 41 and the selecting sleeve 25 so as to move the selecting sleeve 25 in accordance with rotation of the cam groove 41, a switching arm 45 for engaging with the cam groove 42 and the switching sleeve 34 so as to move the switching sleeve 34 in accordance with rotation of the cam groove 42, and two shafts supporting the respective arms 44 and 45 such that the arms 44 and 45 can move in an axial direction (the only shaft 46 is shown). Each of the arms 44 and 45 includes an absorber device 48 using a spring (the only one spring 47 is shown) so as to remove a load or impact at the time of spline engagement. A check mechanism 48a is provided for adjusting the positions of the respective shafts.

Lubricant oil is accumulated in the casing 7. Since the transfer is inclined as shown in FIG. 6, the oil is accumulated at the side of the front-side output shaft 3 which is situated at the lower part of the transfer. For this reason, the oil cannot be easily distributed to the upper part of the transfer T/F. Accordingly, each part of the upper part of the transfer is forcibly lubricated by the oil by means of an oil pump 49.

The oil pump 49 as a trochoid pump is installed behind and adjacent to the distributing device 4, and is driven by the rear-side output shaft 2. As indicated by the arrows of FIG. 5, the oil pump 49 sucks up the oil accumulated at the inner bottom of the casing 7 via a suction pipe 50, and supplies the oil to an oil hole 51 formed at the center part of the rear-side output shaft 2. The oil in the oil hole 51 is supplied to the supporting part of the drive sprocket 14, the selecting device 5, and the subtransmission 6 through respective oil supplying holes 52. The front end part of the oil hole 51 is opened and the oil is supplied to the needle bearing 8 from this opened front end part of the oil hole 51. A cap 53 for preventing the oil from leaking to the outside is attached to the input shaft 1 at the part close to the front end part of the rear-side output shaft 2.

A meter gear 54 is installed on the rear-side output shaft 2 at the rear side thereof behind and adjacent to the rear bearing 13, and the rotation of the meter gear 54 is sensed by a vehicle speed sensor (not shown) via a worm gear 55. For example, after the rotation of the rear-side output shaft 3 passes through the meter gear 54 and the worm gear 55, the rotation of the rear-side output shaft 2 may be reduced to about one third, and the vehicle speed sensor may generate four pulses each time the worm gear 55 rotates once.

Figure 4:
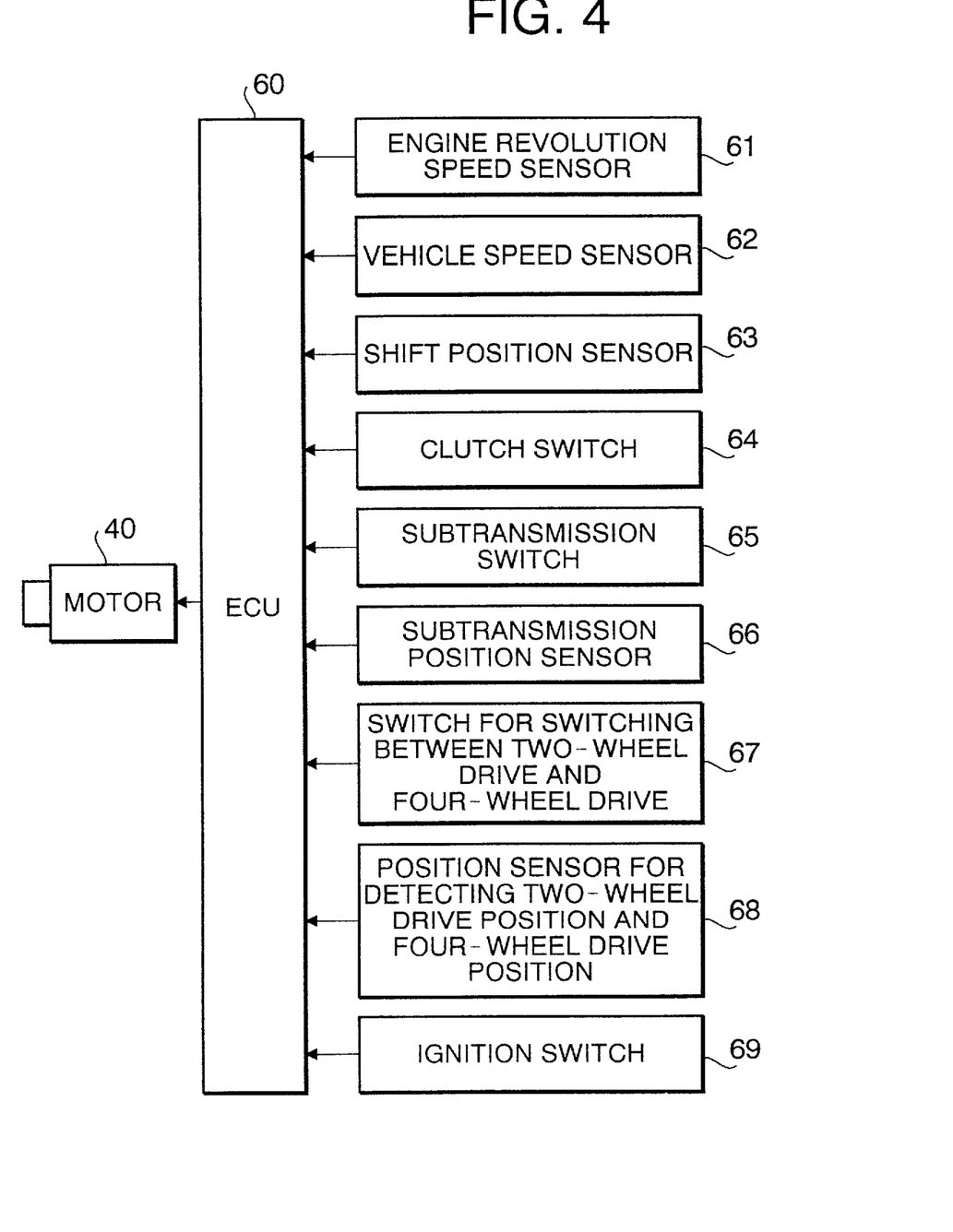
FIG. 4 is a diagram showing structure of a device for controlling the gear shifting according to the embodiment of FIG. 1.

In this embodiment, switching or gear shifting of the selecting device 5 and subtransmission 6 is automatically carried out in accordance with a control signal generated by the electronic control unit. In other words, as shown in FIG. 4, the electronic control unit (ECU) 60 is connected to the transfer. Connected to the ECU 60 are the motor 40, an engine revolution sensor 61, the vehicle speed sensor 62, a shift position sensor 63, a clutch switch 64, a subtransmission switch 65, a subtransmission position sensor 66, a switch 67 for switching between the two-wheel drive and the four-wheel drive, a position sensor 68 for detecting a two-wheel-drive position and a four-wheel-drive position, an ignition switch 69, and the like.

The engine revolution sensor 61 is provided for detecting an engine revolution speed, and specifically generates a pulse to the ECU 60 in accordance with a rotation speed of a crank shaft. The vehicle speed sensor 62 is provided for detecting a vehicle speed, and specifically outputs a pulse to the ECU 60 in accordance with a rotation speed of the worm gear 55 and/or a vehicle speed. The shift position sensor 63 detects a shift position of the main transmission T/M. Specifically, in a manual type of transmission (MT), the neutral position can be detected, and in an automatic type of transmission, the neutral position and a parking position can be detected. The clutch switch 64 is provided only on a manual type of vehicle, and detects whether or not a clutch pedal is depressed.

The subtransmission switch 65 is a manually-operable switch provided in a vehicle room for a driver, and the driver operates and switches the subtransmission switch 65 to cause the switch 65 to output, to the ECU 60, a switching signal for shifting the gear of the subtransmission 6 to the high speed gear position, the neutral position, or the low speed gear position. The subtransmission position sensor 66 detects each of the actual high speed gear, neutral, and low gear positions of the subtransmission 6. The switch 67 for switching between the two-wheel drive and the four-wheel drive is a manually-operable switch provided in the vehicle room for the driver, and the driver carries out a switching operation of the switch 67 to cause the switch 67 to output, to the ECU 60, a switching command signal for switching between the two-wheel drive state and the four-wheel drive state. The two-wheel-drive and four-wheel-drive position sensor 68 detects the actual two-wheel drive state or four-wheel drive state, that is, an engaging or non-engaging state of the selecting device 5.

Next, a method of controlling gear shifting of the subtransmission according to the embodiment of the present invention will now be described along with a method of judging whether or not the gear shifting of the subtransmission can be carried out. The gear shifting of the subtransmission includes shifting to the neutral position as well as shifting to the high speed gear and low speed gear positions.

Since this subtransmission 6 does not have a synchronization mechanism and the gear rate of the low speed gear to the high speed gear is large, the gear shifting of the subtransmission can be carried out only when the vehicle is running at a zero speed or at a very low speed close to zero (in substantially standing state of the vehicle). On the other hand, in such a state where the vehicle is substantially standing, it is impossible to accurately make judgment of the vehicle speed on the basis of the pulse generated by the vehicle speed sensor. For this reason, the judgment of whether or not the vehicle is in the substantial standing state is made in the following manner.

A first condition by which the vehicle can be considered to be running is set as follows (that is, the vehicle is not in a state where the vehicle is substantially standing. The first condition requires the two following requirements (1) and (2) to be satisfied:

(1) the engine should be in a running state; and
(2) in the case of the manual vehicle, the shift position of the main transmission T/M should be a position other than the neutral position, and in the case of the automatic vehicle, the shift position of the main transmission T/M should be a position other than the neutral position and the parking position.

As for the requirement (1), for example, the engine revolution speed is at least an idling revolution speed.

According to the requirement (2), since the main transmission T/M is put in one of gears, it can be determined that the vehicle is running if the engine is in the running state. It should be noted that the first condition can be arbitrarily changed. For example, in the case of the manual vehicle, another requirement that the clutch pedal should not be being depressed may be added to the requirements (1) and (2) or be substituted for the requirement (2). As understood by the above description, vehicle speed data based on the vehicle speed pulse is not used for making judgment whether or not the vehicle is running.

Next, a second condition by which the subtransmission becomes possible is set as follows. The second condition requires the three following requirements (1), (2), and (3) to be satisfied:

(1) the engine revolution number Ne should be equal to or less than a predetermined value N1 (Ne≦N1);
(2) in the case of the manual vehicle, the shift position of the main transmission T/M should be the neutral position, and in the case of the automatic vehicle, the shift position of the main transmission T/M should be the neutral position or the parking position; and
(3) it has become possible to accept the vehicle is standing or running at a very low speed or less.

As for the requirement (1), the value N1 is slightly higher than the normal highest revolution number at the time the vehicle is standing, and in this embodiment, the value N1 is slightly higher than the highest revolution number at the time of a first idling stage (for example, 2000 rpm). The requirement (3) means whether or not the actual vehicle speed is equal to or less than a very low speed at which the gear shifting of the subtransmission can be carried out. Furthermore, the requirement (2) may be arbitrarily changed. For example, in the case of the manual vehicle, another requirement that the clutch pedal should be being depressed may be added to the requirements (1), (2) and (3), or be substituted for the requirement (2). Also in this case, vehicle speed data based on the vehicle speed pulse is not used for making judgment whether or not the gear shifting of the subtransmission can be carried out. As understood later, if all of the requirements (1), (2) and (3) are satisfied, the vehicle generally runs for a certain period by the inertia, and then stops.

These first and second conditions are stored in the ECU 60.

Figure 1:
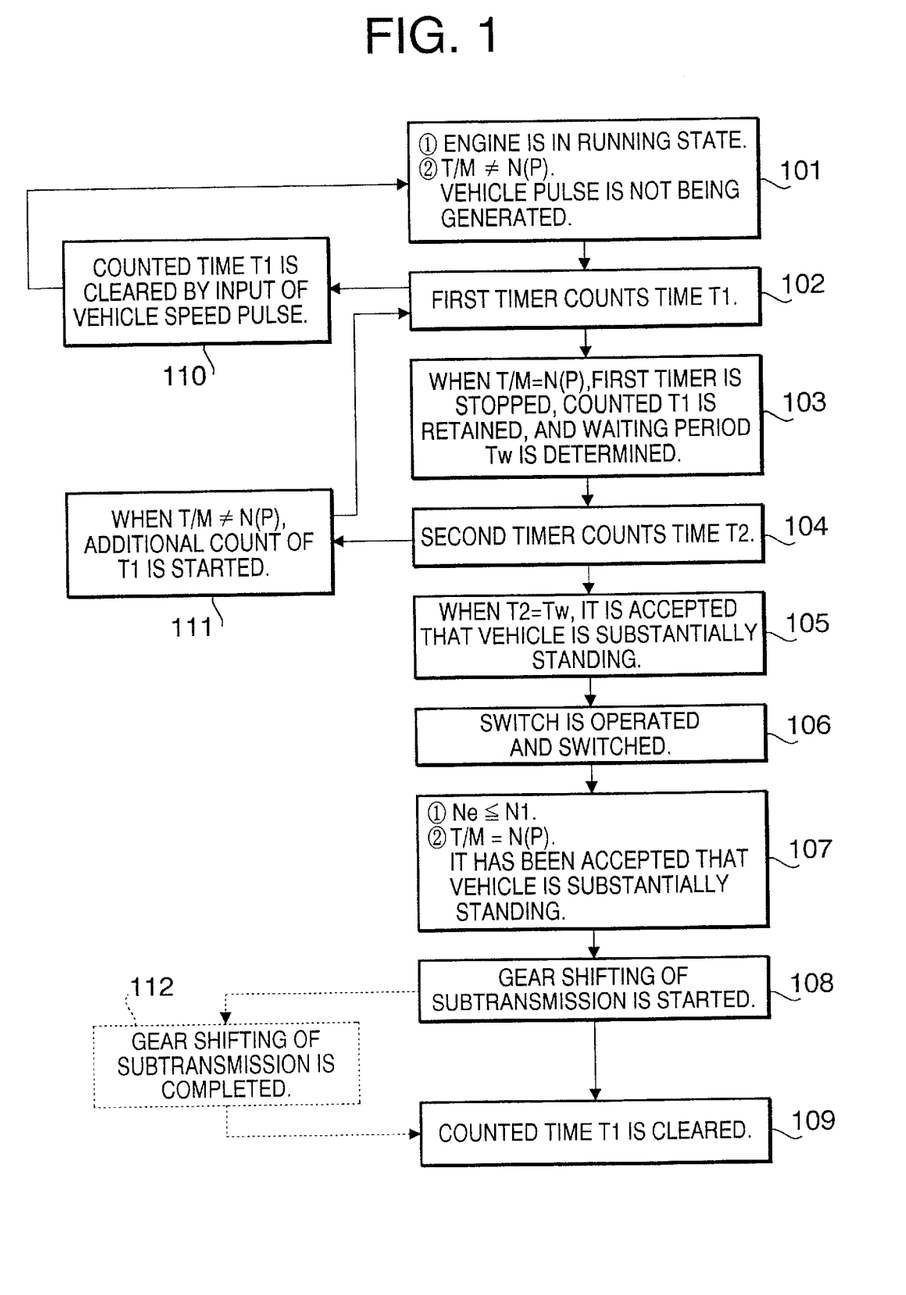
FIG. 1 is a block diagram showing a procedure of controlling gear shifting of a subtransmission according to an embodiment of the present invention.

The procedure for controlling the gear shifting of the subtransmission will now be described by referring to FIG. 1. As shown in FIG. 1, when the first condition is satisfied and the vehicle speed pulse is not being input to the ECU 60 (the step 101), time T1 is counted by a first timer incorporated in the ECU 60 (the step 102). When the vehicle speed pulse is input to the ECU 60, the count of the first timer is cleared (returns to "0") (the step 110). While the vehicle is running, the vehicle speed pulse is generally generated every very short period of time, and is input to the ECU 60. Accordingly, while the vehicle is running, the count by the first timer is cleared each time a vehicle speed pulse is generated, time is counted from the time the count is cleared to the time the next pulse is generated, and this procedure is repeated.

Next, it is assumed that after the driver operates a shift lever, in the case of the manual vehicle, the shift position of the main transmission T/M is changed to the neutral position, and in the case of the automatic vehicle, the shift position is changed to the neutral position or the parking position (the step 103). This state is referred to as "T/M=N (P)". In this case, the first condition becomes unsatisfied, the count by the first timer is stopped at the same time, and the count value T1 is retained. Furthermore, this count value is determined to be the first condition satisfied period of time T1, and a waiting period of time Tw is determined in accordance with a graph shown in FIG. 3 on the basis of the first condition satisfied period T1 (the step 103). The waiting period of time is increased proportionally in accordance with the increase of the first condition satisfied period Tw. The increasing rate of the waiting period Tw changes from the smaller value to the larger value when the first condition satisfied period exceeds a threshold value T11.

Figure 3:
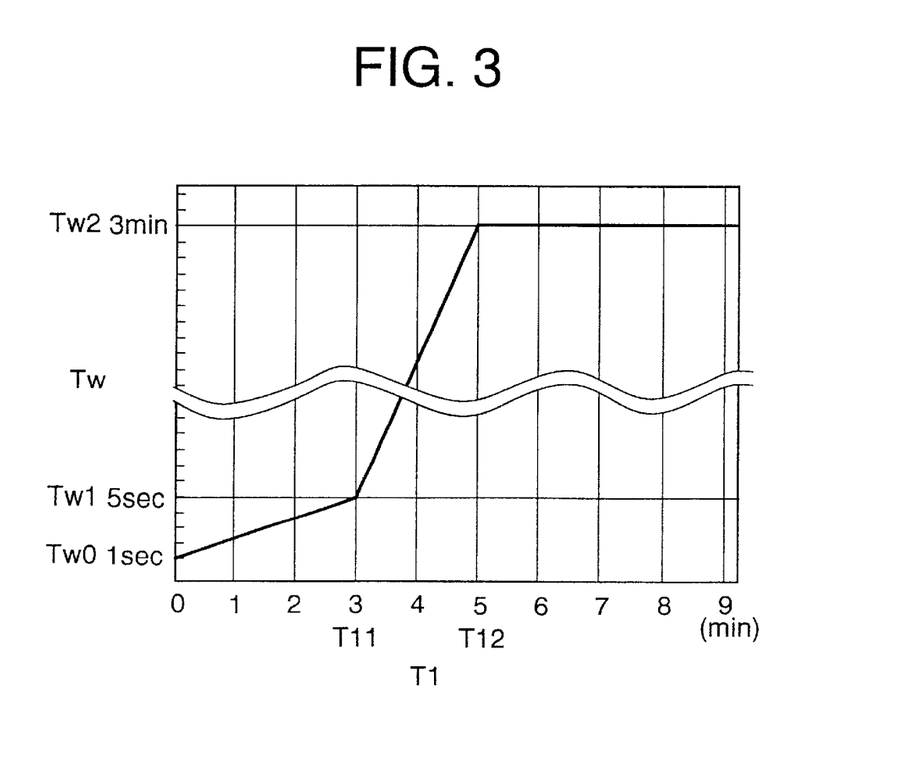
FIG. 3 is a graph showing relation between a first condition satisfied period and a waiting period according to the embodiment of FIG. 1.

Specifically, an initial value of the waiting period Tw is "Tw0=1 second". When the first condition satisfied period T1 is increased from "0" to the threshold value of T11 (in this example, T11=3 minutes), the waiting period Tw is increased from the Tw0 to the Tw1 (in this example, Tw1=5 seconds). When the first condition satisfied period T1 is increased from T11 to T12 (in this example, T12=5 minutes), the waiting period Tw is increased from Tw1 to Tw2 (in this example, Tw2=3 minutes). When the first condition satisfied period T1 is T12 or longer, the waiting period Tw maintains the constant value Tw2.

Particularly, the threshold value T11 is determined to be approximately a maximum period for which a signal (vehicle pulse) is awaited, and in this example, T11 is 3 minutes. As described in detail later, if the vehicle speed pulse is not detected for more than this maximum period, there is strong possibility that a failure such as the breaking of the electric line has occurred.

When the waiting period Tw is determined in this manner, time T2 is counted by a second timer incorporated in the ECU 60 (the step 104). When the count of the time T2 reaches the waiting period Tw, it is accepted that the vehicle is standing or running at a very low speed or less (the step 105).

After that, when the subtransmission switch 65 is switched (the step 106), the ECU 60 judges whether or not the second condition is satisfied (the step 107). If the second condition is satisfied, the gear shifting of the subtransmission is started (the step 108), and the retained count of the first timer is cleared simultaneously (the step 109). Alternatively, as indicated by the dashed line of FIG. 1, after the gear shifting of the subtransmission is completed (the step 112), the count of the first timer may be cleared (the step 109).

It is assumed that after it becomes possible to carry out the gear shifting of the subtransmission, the shift lever is operated by the driver. At this time, in the case where the shift position or gear position of the main transmission T/M of the manual vehicle is changed to a position other than the neutral position, or in the case where the shift position of the main transmission T/M of the automatic vehicle is changed to a position other than the neutral position and the parking position (this state is referred to as T/M≠N(P)), the additional count of the first timer which is retained in the step 103 is started (the step 111).

Figure 2:
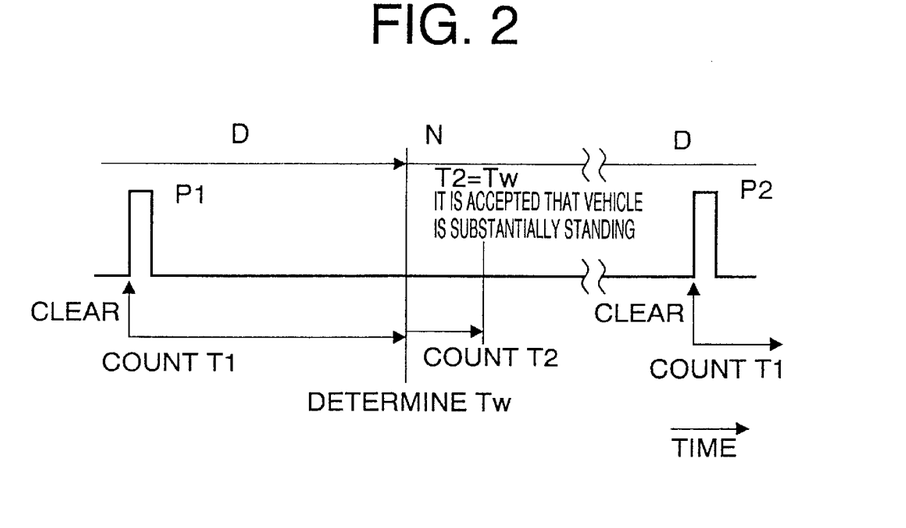
FIG. 2 is a time chart showing control of the gear shifting of the subtransmission and a state when a vehicle stops according to the embodiment of FIG. 1.

The above-described gear shifting control procedure will now be applied to an actual vehicle running state. In the gear shifting control, a case where the automatic vehicle stops is shown in FIG. 2. More specifically, FIG. 2 shows a case where the brake pedal is depressed by the driver with the shift position being in a drive range (drive position or D range), the vehicle is slowed down and stopped, and the vehicle starts to run again. A vehicle speed pulse P1 at the left side of FIG. 2 is the last pulse before the vehicle stops.

At the same time the last pulse P1 is generated, the count of the first timer is cleared, and another count of the first timer is started (refer to the steps 101, 102, and 110 in FIG. 1). In due course of time, if the driver changes the shift lever to the neutral position, the count of the first timer is completed, and this count is determined to be the first condition satisfied period T1. At the same time, the waiting period Tw is determined in accordance with the graph of FIG. 3, and a count of the second timer is started (refer to the steps 103 and 104 in FIG. 1). Next, when the count value T2 of the second timer reaches the determined waiting period Tw, the count of the second timer is completed, and it is accepted that the vehicle is standing or running at a very low speed or less (refer to the step 105 in FIG. 1). Accordingly, after that, if the subtransmission switch 65 is switched (refer to the step 106 in FIG. 1), and if the second condition is satisfied (refer to the step 107 in FIG. 1), the gear shifting of the subtransmission 6 is carried out. At the same time the gear shifting of the subtransmission is completed, the counted value of the first timer is cleared and another count of the first timer is started.

As in this manner, in this embodiment, the vehicle speed value or data is not used for judging whether or not the gear shifting of the subtransmission can be carried out. In a conventional manner, a condition by which the gear shifting can be carried out includes a requirement that the vehicle speed should be a very low speed (for example 2 kilometer per hour) or less. If this conventional manner is adopted, the above-described problem that the driver feels something wrong with the switching operation occurs because the vehicle speed value is not accurate when the vehicle speed is very low. According to this embodiment of the present invention, the vehicle speed value is not used, and therefore, it is possible to prevent this problem.

In FIG. 2, in one example, a signal (vehicle speed pulse) may be awaited while the brake pedal is being depressed with the shift position being in the drive range. In the corresponding case of the manual vehicle, a signal may be awaited while the brake pedal is being depressed with the vehicle being put in the gear. In these cases, when the shift lever is changed to the neutral position or the parking position in order to carry out the gear shifting of the subtransmission after the last pulse is generated, the waiting period Tw is determined by taking into account the time T1 which is a period from the time the pulse is generated to the time the sift lever is operated. In normal signal waiting, the period from the time the pulse is generated to the time the shift lever is operated is generally 3 minutes (T11) or less, and the waiting period Tw becomes a short period of 5 seconds (Tw1) or less.

In a case where the driver tries to carry out the gear shifting of the subtransmission when the vehicle is running at an extremely low speed, for example, directly before the vehicle completely stops, the period T1 from the time a pulse is generated to the time the shift lever is operated is an extremely short period, and following the T1, the waiting period Tw also becomes an extremely short period whose value is actually near "Tw0=1 second". In this case, it seems that the switch is operated by the driver immediately after the shift lever is operated. However, since the waiting period Tw is empirically 1 second plus α, as a result, the switch is operated and switched after the waiting period Tw has passed. Accordingly, the gear shifting of the subtransmission is carried out directly after the switch 65 is operated and switched, and therefore, the driver does not feel that something is wrong with the switching operation On the other hand, in a case where the period from the time a pulse is generated to the time the shift lever is operated is "T11=3 minutes" or more, it seems that this situation is not normal any more, and it is can be expected that the pulse does not enter the ECU 60 normally because the vehicle speed sensor malfunctions or the electric line is broken. In this case, the waiting period Tw is determined to be a long period of "Tw1=5 seconds" or more, and the increase rate of the waiting period Tw to the period T1 rises to a value larger than the value in the above-described normal signal waiting. Accordingly, the waiting period Tw which has been determined when the shift lever is operated has become a large value, and even if the driver operates the switch 65, the gear shifting of the subtransmission is not carried out because the waiting period Tw has not passed yet. Therefore, in a case where there is a failure, it is possible to solve the problem that the gear shifting of the subtransmission is carried out while the vehicle is running. In addition to that, even if the driver operates the switch (in a certain case, many times), the gear shifting of the subtransmission is not carried out, so that the driver can recognizes that something is wrong with the switching operation from this fact. In this embodiment, since a failure notification to the driver is achieved without using a specific circuit for judging whether or not there is a failure, a rise in cost can be prevented, and improvement in output accuracy or performance of each element or component is not required.

However, there is an exception to this. That is, even in a normal case where there is not a failure, if the period T1 is larger than "T11=3 minutes", the operation of the switch 65 does not result in the gear shifting of the subtransmission. This case, however, is a rare case, and scarcely becomes a problem as a practical matter.

As stated above, according to the embodiment of the present invention, a state where the vehicle is substantially standing is accurately recognized without using a vehicle speed value based on a vehicle speed pulse. When the vehicle is substantially standing, it is possible to immediately carry out the gear shifting of the subtransmission, and the driver does not feel something is wrong with the switching operation. Furthermore, when there is a failure, the gear shifting of the subtransmission can be securely prevented while the vehicle is running.

In the meantime, after the count of the second timer is completed (T2=Tw) and it is accepted that the vehicle is standing or running at a very low speed or less, the driver sometimes enters the shift lever into the drive range again because a traffic signal is changed to green or the driver changes his mind. In this case, the procedure proceeds to the step 111 from the step 105 in FIG. 1, and the additional count of the first timer is started from the retained count value. The count of the first timer, however, is cleared by the input of the next pulse.

In conjunction with the steps 106 to 108, at the time the switch 65 is operated and switched, the gear shifting of the subtransmission is carried out on condition that all of the requirements in the step 107 are satisfied. Even if all of the requirements in the step 107 becomes satisfied after the switch 65 is operated and switched, the gear shifting of the subtransmission is not carried out (that is, the gear shifting of the subtransmission is prohibited when the condition of the step 107 becomes satisfied from an unsatisfied state after the switch 65 is operated).

The count of the first timer is cleared by input of a vehicle speed pulse in the step 110, and the start or completion of the gear shifting of the subtransmission in the step 108 or 112. In addition to that, the count may be also cleared when the ignition switch 69 is turned on or off.

In FIG. 3, when the value T1 is T12 or more (T1≧T12), the waiting period Tw is set to be the constant value (Tw=Tw2) so as to prevent the count from exceeding the figure (countable value) of the first timer.

It is understood that other different embodiments of the present invention may be made without departing from the sprit and scope thereof. For example, the subtransmission may be a different type of subtransmission which does not adopt the two-stage high-speed-gear-and-low-speed-gear type or the planetary type. Also, the subtransmission may be installed on a part other than the transfer (for example, the subtransmission may be installed on the main transmission).

In conclusion, the following outstanding advantages are attained. A state where the vehicle is substantially standing can be accurately recognized, and when the vehicle is substantially standing, the gear shifting of the subtransmission can be carried out immediately. In addition to that, when there is a failure, the switching of the subtransmission can be securely prevented while the vehicle is running.

What is claimed is:

1. A device for controlling gear shifting of a subtransmission provided on a vehicle, comprising:
    vehicle speed pulse generating means for generating a vehicle speed pulse in accordance with a vehicle speed;
    first judging means for, without depending on the vehicle speed pulse, judging whether or not a first condition by which the vehicle can be considered to be running is satisfied;
    first timer means for counting a period of time for which the first condition is satisfied, from the time each vehicle speed pulse is generated;
    first condition satisfied period determining means for determining the period counted by the first timer means to be a first condition satisfied period at the moment the first condition becomes unsatisfied from a satisfied state;
    waiting period determining means for determining a waiting period in a predetermined manner by using the first condition satisfied period;
    second timer means for counting a period of time from the time the first condition becomes unsatisfied from the satisfied state; and
    vehicle speed requirement accepting means for accepting that a vehicle is standing or running at the very low speed or less, when the period counted by the second timer means reaches the determined waiting period,
    wherein the gear shifting of the subtransmission is controlled by using an actuator and a control unit, and can be carried out only when the vehicle is standing or running at the very low speed or less.

2. The device for controlling the gear shifting of the subtransmission according to claim 1, further comprising:
    a switch for being manually operated so as to make a command to the effect that the gear shifting of the subtransmission should be carried out; and
    second judging means for judging whether or not a second condition is satisfied, the second condition including a requirement that the vehicle should be standing or running at the very low speed or less,
    wherein when the second condition is satisfied, the gear shifting of the subtransmission becomes possible,
    when the switch is operated and switched, if the second condition is satisfied, the gear shifting of the subtransmission is carried out, and
    when the switch is operated and switched, if the second condition is not satisfied, the gear shifting of the subtransmission is not carried out.

3. The device for controlling the gear shifting of the subtransmission according to claim 2, wherein when the switch is operated and switched, if the second condition is not satisfied, the gear shifting of the subtransmission is not carried out even if the second condition becomes satisfied after the switch is operated and switched.

4. The device for controlling the gear shifting of the subtransmission according to claim 1, wherein the first condition includes a requirement that an engine should be in a running state, and a requirement that a shift position of a main transmission of the vehicle should be a position other than a neutral position and a parking position.

5. The device for controlling the gear shifting of the subtransmission according to claim 2, wherein the second condition further includes a requirement that an engine revolution speed should be equal to or less than a predetermined value, and a requirement that a shift position of a main transmission of the vehicle should be a neutral position or a parking position.

6. The device for controlling the gear shifting of the subtransmission according to claim 1, wherein the predetermined manner is a manner in which the waiting period is increased as the first condition satisfied period is increased, and a increase rate of the waiting period to the first condition satisfied period is changed to a larger value from a smaller value when the first condition satisfied period exceeds a predetermined threshold value.

7. The device for controlling the gear shifting of the subtransmission according to claim 6, wherein the predetermined threshold value is approximately a maximum period for which the vehicle speed pulse is awaited.

8. The device for controlling the gear shifting of the subtransmission according to claim 1, wherein at the same time the first condition becomes unsatisfied from the satisfied state, the period counted by the first timer means is retained, and then if the first condition becomes satisfied from an unsatisfied state where the period counted by the first timer means is retained, the first timer means starts an additional count of the retained period.

9. The device for controlling the gear shifting of the subtransmission according to claim 1, wherein the period counted by the first timer means is cleared each time the each vehicle speed pulse is generated.

10. The device for controlling the gear shifting of the subtransmission according to claim 1, wherein the period counted by the first timer means is cleared when an ignition switch is turned off.

11. The device for controlling the gear shifting of the subtransmission according to claim 1, wherein at the same time the gear shifting of the subtransmission is started or completed, the period counted by the first timer means is cleared.

12. The device for controlling the gear shifting of the subtransmission according to claim 1, wherein the vehicle is a four-wheel-drive vehicle, and the subtransmission is installed on a transfer of the four-wheel-drive vehicle.

13. A method of controlling gear shifting of a subtransmission by using an actuator and a control unit, in which the subtransmission is installed on a vehicle, and can be switched only when the vehicle is substantially standing, said method comprising:

generating a vehicle speed pulse in accordance with a vehicle speed;

counting a first period of time for which a first condition is satisfied, from the time each vehicle speed pulse is generated, wherein the vehicle can be considered to be running by the first condition without depending on the vehicle speed pulse;

determining the counted first period of time to be a first condition satisfied period at the same time the first condition becomes unsatisfied from a satisfied state;

determining a waiting period in a predetermined manner by using the first condition satisfied period;

counting a second period of time from the time the first condition becomes unsatisfied from the satisfied state; and accepting that a vehicle is standing or running at the very low speed or less when the counted second period of time reaches the determined waiting period.

* * * * *